United States Patent [19]

Willcox et al.

[11] 4,370,437

[45] Jan. 25, 1983

[54] NITRITE-SORBATE STABILIZING SYSTEM

[75] Inventors: Kenneth W. Willcox; James C. Randall, both of Bartlesville, Okla.

[73] Assignee: Phillips Petroleum Company, Bartlesville, Okla.

[21] Appl. No.: 345,967

[22] Filed: Feb. 5, 1982

[51] Int. Cl.$^3$ .............................................. C08K 0/00
[52] U.S. Cl. .................................... 524/397; 524/429
[58] Field of Search ...................... 524/397, 400, 429; 562/601; 252/400 R

[56] References Cited

U.S. PATENT DOCUMENTS 3,173,948 3/1965 Probst et al. ....................... 562/601
3,565,853 2/1971 Moon ................................. 260/45.9
3,592,794 7/1971 Drake et al. ....................... 260/45.9
3,717,577 2/1973 Moon ............................... 260/45.75

OTHER PUBLICATIONS

Ceresa, Block and Graft Copolymerization, vol. 1, pp. 176 and 177 (1963).
Briston, Plastic Films, pp. 66–68 (1974).

*Primary Examiner*—V. P. Hoke

[57] ABSTRACT

The addition of a nitrite-sorbate stabilizing system to a copolymer of a conjugated diene and a monovinyl-substituted aromatic hydrocarbon improves thermal stability and suppresses gel and fisheye formation.

22 Claims, No Drawings

NITRITE-SORBATE STABILIZING SYSTEM

This invention relates to a novel composition of a polymer and a nitrite-sorbate stabilizing system. This invention also relates to a method for stabilizing a polymer by incorporation of a nitrite-sorbate stabilizing system into the polymer. More particularly this invention relates to the stabilization of polymers against gel and/or fisheye formation and to the improvement of polymer thermal stability.

The polymers contemplated in the practice of this invention are copolymers formed from (1) a monovinyl-substituted aromatic hydrocarbon monomer and (2) a conjugated diene monomer. The nitrites and sorbates useful in the practice of this invention are the Group IA and IIA metal nitrites and sorbates which are at least partly soluble in water.

Associated with the fabrication of articles from resinous copolymers of the above-described type are the problems of gel and/or fisheye formation.

The formation of gels is evident in extruded films and sheets and especially in those of thinner gage material from which articles are fabricated by thermoforming techniques into blister packaging, containers, etc. Although not as evident, gels are also present in thicker wall articles made by injection molding or blow molding.

The gels are believed to be hard crosslinked polymer particles that originate during the polymerization process and subsequently during finishing or recovery of the polymer cement.

The different types of fisheyes can be distinguished by their manner of formation. They appear to form around nuclei of particulate matter which may be gels or other dense particles such as dirt, trash, char and the like that have sloughed off of an extruder screw or other surface in an extrusion system. The refraction of light from the polymer material immediately surrounding the nucleation point is different from the refraction of light from the fisheye-free areas of the article and thus creates a fisheye appearance.

It has been discovered that the nitrite-sorbate stabilizing system of this invention can be used to suppress fisheyes created by gels.

Another aspect of this invention relates to the improvement of polymer thermal stability. The copolymers of this invention have many commercial applications because they are inexpensive to manufacture and have various desirable physical and chemical characteristics. In many applications these normally solid polymers are processed by heating until they become sufficiently soft to permit incorporation of compounding ingredients and subsequent shaping of the polymer into the desired form by various techniques such as extrusion, injection molding, blow molding, centrifugal casting and the like. At the elevated temperatures necessary for processing, crosslinking of the polymer occurs. This crosslinking causes a melt flow decrease which creates problems in compounding and processing. Accordingly, it is desirable to improve the thermal stability of the polymer, i.e., to inhibit crosslinking at elevated temperatures.

Melt flow is the amount of a polymer that can be forced through an orifice when subjected to a given force over a given time interval at a given temperature. Melt flow may also be expressed in terms of the time required to extrude a constant volume of a polymer through an orifice at a given temperature and force. If crosslinking occurs then the amount of the polymer that can be extruded over a given time interval decreases or, in other words, the amount of time required to extrude a given volume of the polymer increases. Either expression can be used to designate melt flow decrease or dropoff. Naturally, if the extent of crosslinking is too great, the retarded flow of the polymer will create processing problems.

An example of a processing problem associated with melt flow decrease or dropoff during hot melt processing is the increased cycle time required for various molding processes due to the longer time required by the less fluid polymer to fill the mold. Another problem can arise during an extrusion pelletizing process when a melt flow decrease results in flow characteristic changes and therefore different processing characteristics which limit the potential applications of the process polymer.

It has been found that incorporation of the nitrite-sorbate system of this invention into a polymer can improve the thermal stability of the polymer.

The most closely related prior art references of which we are aware are U.S. Pat. No. 3,592,794 and U.S. Pat. No. 3,717,577. These patents disclose the melt flow stabilization of diene polymers (U.S. Pat. No. 3,592,794) and mono-olefin polymers (U.S. Pat. No. 3,717,577) with an alkali metal nitrite alone or in combination with an alkali metal bisulfite. The use of sorbates, however, is not disclosed. Accordingly, it is believed that this invention constitutes a patentable contribution to the art.

It is an object of this invention to provide a new polymer composition stabilized against gel and/or fisheye formation. It is also an object of this invention to provide a new polymer composition of improved thermal stability.

A further object of this invention is to provide a new method for the stabilization of polymers against gel and/or fisheye formation. An additional object of this invention is to provide a new method for improving the thermal stability of a polymer.

These and other objects will be made apparent from a study of this disclosure and the appended claims.

The polymer to be employed in accordance with this invention is a resinous linear or radial block copolymer of a conjugated diene and a monovinyl-substituted aromatic hydrocarbon. It is preferred that the conjugated diene monomer contain from about 4 to about 12 carbon atoms per molecule and that the monovinyl-substituted aromatic hydrocarbon monomer contain from about 8 to about 18 carbon atoms per molecule. U.S. Pat. No. 3,639,517 (Kitchen and Szalla) discloses the preparation of some resinous block copolymers suitable for use in the practice of this invention. The disclosure of U.S. Pat. No. 3,639,517 is incorporated by reference into this disclosure.

Examples of conjugated dienes, and mixtures thereof, that may be employed as monomers in the preparation of a suitable copolymer are 1,3-butadiene, isoprene, 2,3-dimethyl-1,3-butadiene, piperylene, 3-butyl-1,3-octadiene and 2-phenyl-1,3-butadiene.

Examples of suitable monovinyl-substituted aromatic hydrocarbon monomers include styrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl) styrene, 1-vinylnaphthalene and 2-vinylnaphthalene. The monovinyl-substituted aromatic hydrocarbon can contain alkyl, cycloalkyl and aryl substituents and combinations thereof such as alkyl-aryl.

The currently preferred polymer is a resinous linear or radial butadiene-styrene block copolymer that comprises from about 5 to about 30 weight percent polymerized 1,3-butadiene and from about 95 to about 70 weight percent polymerized styrene with the copolymer having a melt flow in the range of about 0.5 to about 20 g/10 min as determined by ASTM D 1238-65T, condition G.

The nitrites to be used in the practice of this invention are the metal nitrites which are at least partly soluble in water and are derived from the metals of Groups IA and IIA of the Periodic Table of Elements. Specific examples include sodium nitrite, lithium nitrite, potassium nitrite, barium nitrite, calcium nitrite and strontium nitrite. Calcium nitrite and potassium nitrite are presently preferred.

The sorbates to be used in the practice of this invention are the metal sorbates which are at least partly soluble in water and are derived from the metals of Groups IA and IIA of the Periodic Table of Elements. The alkali metal sorbates, especially potassium sorbate, are preferred.

Generally, the nitrite-sorbate stabilizing system will have a nitrite to sorbate mole ratio ranging from about 1:5 to about 5:1. A mole ratio of about 1:1 is presently preferred for the calcium nitrite-potassium sorbate system. A mole ratio of about 2:1 is presently preferred for the potassium nitrite-potassium sorbate system. The amount of the nitrite-sorbate stabilizer to be employed can be based upon the amount of the metal nitrite component. Generally about 1 to about 40 ppm metal nitrite based on the resin composition is sufficient. Presently it is preferred to use about 10 ppm of each component, i.e., 10 ppm nitrite and 10 ppm sorbate. It should be noted that the scope of this invention is not restricted to any of the above ranges but rather requires only that a finite amount of each component sufficient to suppress gel and/or fisheye formation or to improve thermal stability be used.

If the nitrite-sorbate system is employed in the form of an aqueous solution, treatment of the polymer or resin during polymerization may be counterproductive since water is a polymerization poison. However, gels formed during polymerization are believed to be less of a problem than those formed during the finishing or recovery step and, accordingly, the nitrite-sorbate system may be limited to post-polymerization use with good results. This is presently the preferred method.

The nitrite-sorbate system can be admixed with the resin in any suitable manner such that, preferably, an even distribution is obtained. In one process the components, in finely divided form, can be compounded with the resin to form a concentrate which is subsequently mixed with virgin resin in an extruder or the like to obtain the desired composition. In another process the components can be dissolved in water and diluted with an alcohol such as ethanol to obtain a stock solution, e.g., a stock solution comprising 95 volume percent ethanol. Sufficient stock solution to wet the resin particles and to obtain the desired concentration of the stabilizing system can then be employed. The wetted polymer, preferably in the form of particles or pellets, can be tumbled during or after the addition of the stock solution to improve distribution. Following this treatment, solvents are evaporated, for example by gentle heating, and the treated polymer can be processed into the desired articles.

EXAMPLE

Samples were prepared by admixing 100 parts by weight of a commercially obtained radial butadiene-styrene block copolymer containing about 76 weight percent polymerized styrene units and about 24 weight percent polymerized butadiene units and the specified amounts of the metal nitrite and/or potassium sorbate. The block copolymer can be further characterized as having a density of 1.01 g/cm$^3$ as determined by ASTM D 792 and a flow rate of about 6 g/10 min as determined by ASTM D 1238, Condition G. The primary stabilizing system for the block copolymer consisted of 0.90 weight percent trisnonylphenylphosphite and 0.24 weight percent octadecyl [3-(3,5-di-t-butyl-4-hydroxyphenyl)] propionate. Also included in the composition was 0.3 weight percent microcrystalline wax as an antiblocking agent. The metal nitrite and/or potassium sorbate component in a known amount was dissolved in a mixture containing 5 cc water and 95 cc ethanol (absolute) or 10 cc water and 90 cc ethanol (absolute), the total volume in either case being 100 cc. The amount of solution required to furnish the specified amount of metal nitrite and/or potassium sorbate was added to 100 g of ground resin. The mixture was air dried and then further mixed by passage through an extruder. The extrudate, in the form of strands, was chopped into pellets by passage under revolving knives.

Some of the samples were prepared in another manner by dry blending 25 lbs of the resin with sufficient metal nitrite to provide 40 ppm metal nitrite based upon the weight of the resin. Each mixture was pelletized as above.

The relative formation of gels and fisheyes in each run was tested as follows. A 100–200 g pellet sample was extruded through a clean extruder fitted with a 4" slot film die. The polymer was allowed to set in the extruder for one hour at 450° F. (232° C.) before extrusion of a 10 mil thick film. Fresh, untreated polymer was used to purge the extruder. Five minutes after purging was started a film sample was taken and mounted on a 2"×4" cardboard holder with a ¾" diameter center hole. The mounted sample was placed in a Cary 14 spectrophotometer and its absorbance measured at 400 millimicrons. The formation of gels and fisheyes, relative to other samples, is measured by the absorbance. A relatively high absorbance indicates a relatively high presence of gels and fisheyes.

The thermal stability of the polymer in each run was tested by measuring melt flow decrease. For this purpose a Monsanto Automatic Capillary Rheometer (ACR) was used. The ACR measures the time (sec.) required to extrude a constant volume of polymer through an orifice after a determined time (min.) at a set temperature. Measurements were made at 250° C. after 5, 20, 30 and 40 minute intervals. A comparison of extrusion time (sec.) after 5 minutes to extrusion time (sec.) after 40 minutes provides an indication of thermal stability. The greater the increase in extrusion time (sec.) the less thermally stable the polymer sample, i.e., the greater the extent of crosslinking.

The experimental results are expressed in the following table.

TABLE I

| Run | Metal Salt | | Extrusion Time (sec) ACR at 250° C. after | | | | Absorbance of 10 mil. Film at 400 |
|---|---|---|---|---|---|---|---|
| No. | Name | ppm | 5 min. | 20 min. | 30 min. | 40 min. | millimicrons |
| 1 | none | none | 35 | 38 | 50 | 76 | 0.365 (control) |
| 2 | sodium nitrite | 10 | 37 | 31 | 28 | 32 | 0.125 |
| 3 | sodium nitrite | 20 | 34 | 29 | 28 | 29 | 0.115 |
| 4 | sodium nitrite | 40 | 32 | 25 | 24 | 24 | 0.110 |
| 5 | potassium nitrite | 10 | 37 | 34 | 33 | 35 | 0.130 |
| 6 | potassium nitrite | 40 | 33 | 27 | 25 | 25 | 0.115 |
| 7 | potassium sorbate | 40 | 36 | 40 | 58 | 86 | 0.418 (control) |
| 8 | calcium nitrite | 10 | 32 | 35 | 39 | 58 | 0.171 |
| 9 | calcium nitrite | 20 | 36 | 33 | 37 | 53 | not determined |
| 10 | calcium nitrite | 40 | 31 | 26 | 25 | 27 | 0.110 |
| 11 | calcium nitrite & potassium sorbate | 10 ea. | 33 | 28 | 29 | 38 | 0.110 |
| 12 | potassium nitrite & potassium sorbate | 10 ea. | 41 | 29 | 38 | 46 | 0.110 |
| 13 | sodium nitrite & potassium sorbate | 10 ea. | 37 | 32 | 30 | 34 | 0.170 |

Runs 1 and 7 are the control runs. Runs 2–6 and 8–10 were made for purposes of comparison. Runs 11, 12 and 13 are examples of this invention in practice.

Associated with control run 1 (no nitrite or sorbate) is a relatively high absorbance (indicating a relatively high amount of gels and fisheyes) and increasingly high extrusion times (indicating relatively poor thermal stability, i.e., crosslinking). Control run 7 appears to show that potassium sorbate alone increases absorbance and extrusion time (sec.), i.e., it increases gel and fisheye formation and diminishes thermal stability.

The contribution of the metal nitrites in suppressing gel and/or fisheye formation and in improving thermal stability is readily apparent from the lower absorbance and ACR extrusion times.

Inspection of the results for runs 11 (10 ppm each of Ca-nitrite and K-sorbate) and 12 (10 ppm each of K-nitrite and K-sorbate) indicates that these stabilizing systems provided comparable or more thermal stability and more protection against gel and fisheye formation than related runs 8 and 5 in which 10 ppm of the respective metal nitrite was present alone. The data show in runs 6 and 10 that the metal nitrite content must be increased to 40 ppm to obtain results similar to the results of the nitrite-sorbate systems of runs 11 and 12.

The results for run 13 (10 ppm each of Na-nitrite and K-sorbate) do not show decreases in absorbance or extrusion time (sec) as compared to run 2 (10 ppm of Na-nitrite).

The examples have been included in this disclosure to illustrate the practice of this invention and should not be interpreted to limit the scope of the invention.

Reasonable modification of and variation from the invention as set forth in this disclosure and appended claims are also contemplated to be within the scope of patent protection desired and sought.

We claim:

1. A composition comprising:
   (a) a linear or radial block copolymer of a conjugated diene and a monovinyl-substituted aromatic hydrocarbon;
   (b) a metal nitrite; and
   (c) a metal sorbate; wherein said metal nitrite and said metal sorbate are independently derived from the metals of Groups IA and IIA of the Periodic Table of Elements; wherein said metal nitrite and said metal sorbate are at least partly soluble in water; and wherein said metal nitrite and said metal sorbate are added in amounts sufficient to at least partially suppress gel or fisheye formation or to improve thermal stability.

2. A composition in accordance with claim 1 wherein said metal nitrite is calcium nitrite.

3. A composition in accordance with claim 1 wherein said metal nitrite is potassium nitrite.

4. A composition in accordance with claim 1, 2 or 3 wherein said metal sorbate is potassium sorbate.

5. A composition in accordance with claim 1, 2 or 3 wherein said copolymer is a normally solid resinous linear or radial block copolymer of a conjugated diene containing from about 4 to about 12 carbon atoms and a monovinyl-substituted aromatic hydrocarbon containing from about 8 to about 18 carbon atoms per molecule.

6. A composition in accordance with claim 5 wherein said metal sorbate is potassium sorbate.

7. A composition in accordance with claim 5 wherein said copolymer is a copolymer of 1,3-butadiene and styrene.

8. A composition in accordance with claim 6 wherein said copolymer is a copolymer of 1,3-butadiene and styrene.

9. A composition in accordance with claim 1, 2 or 3 wherein the amount of said metal nitrite and said metal sorbate is from about 1 to about 40 ppm each based upon the copolymer composition.

10. A composition in accordance with claim 4 wherein the amount of said metal nitrite and said metal sorbate is from about 1 to about 40 ppm each based upon the copolymer composition.

11. A composition in accordance with claim 7 wherein said copolymer comprises from about 5 to 30 weight percent polymerized 1,3-butadiene and from about 95 to 70 weight percent polymerized styrene; and wherein said copolymer has a melt flow in the range of about 0.5 to about 20 g/10 min. as determined by ASTM D 1238-65T, condition G.

12. A method which comprises admixing with a resinous block copolymer of a conjugated diene and a monovinyl-substituted aromatic hydrocarbon a metal nitrite and a metal sorbate; wherein said metal nitrite and said metal sorbate are independently derived from the metals of Groups IA and IIA of the Periodic Table of Elements; wherein said metal nitrite and said metal sorbate are at least partly soluble in water; and wherein said metal nitrite and said metal sorbate are added in amounts sufficient to at least partially suppress gel or fisheye formation or to improve thermal stability.

13. A method in accordance with claim 12 wherein said metal nitrite is calcium nitrite.

14. A method in accordance with claim 12 wherein said metal nitrite is potassium nitrite.

15. A method in accordance with claim 12, 13 or 14 wherein said metal sorbate is potassium sorbate.

16. A method in accordance with claim 12, 13 or 14 wherein said copolymer is a normally solid resinous linear or radial block copolymer of a conjugated diene containing from about 4 to about 12 carbon atoms and a monovinyl-substituted aromatic hydrocarbon containing from about 8 to about 18 carbon atoms per molecule.

17. A method in accordance with claim 16 wherein said metal sorbate is potassium sorbate.

18. A method in accordance with claim 16 wherein said copolymer is a copolymer of 1,3-butadiene and styrene.

19. A method in accordance with claim 17 wherein said copolymer is a copolymer of 1,3-butadiene and styrene.

20. A method in accordance with claim 12, 13 or 14 wherein the amount of said metal nitrite and said metal sorbate is from about 1 to about 40 ppm each based upon the copolymer composition.

21. A method in accordance with claim 15 wherein the amount of said metal nitrite and said metal sorbate is from about 1 to about 40 ppm each based upon the copolymer composition.

22. A method in accordance with claim 18 wherein said copolymer comprises from about 5 to 30 weight percent polymerized 1,3-butadiene and from about 95 to 70 weight percent polymerized styrene; and wherein said copolymer has a melt flow in the range of about 0.5 to about 20 g/10 min as determined by ASTM D 1238-65T, condition G.

* * * * *

UNITED STATES PATENT AND TRADEMARK OFFICE
CERTIFICATE OF CORRECTION

PATENT NO. : 4,370,437

DATED : January 25, 1983

INVENTOR(S) : Kenneth W. Wilcox and James C. Randall

It is certified that error appears in the above-identified patent and that said Letters Patent are hereby corrected as shown below:

Column 6, line 1, change "get" to ---gel---.

Signed and Sealed this

Twenty-sixth Day of April 1983

[SEAL]

Attest:

GERALD J. MOSSINGHOFF

Attesting Officer

Commissioner of Patents and Trademarks